United States Patent
Takaba

[11] Patent Number: 5,878,284
[45] Date of Patent: Mar. 2, 1999

[54] ONE-TIME USE CAMERA

[75] Inventor: Tetsufumi Takaba, Hino, Japan

[73] Assignee: Konica Corporation, Japan

[21] Appl. No.: 792,146

[22] Filed: Jan. 31, 1997

[30] Foreign Application Priority Data

Feb. 8, 1996 [JP] Japan .................................... 8-022449

[51] Int. Cl.[6] .................................................. G03B 17/24
[52] U.S. Cl. ................................................. 396/6; 396/540
[58] Field of Search ........................................ 396/6, 540

[56] References Cited

U.S. PATENT DOCUMENTS 5,426,478  6/1995  Katagiri et al. .......................... 396/540
5,574,524  11/1996  Petruchik .................................. 396/411
5,608,486  3/1997  Takagi et al. ............................... 396/6
5,623,712  4/1997  Onda et al. .............................. 396/540

*Primary Examiner*—David M. Gray
*Attorney, Agent, or Firm*—Jordan B. Bierman; Bierman, Muserlian and Lucas

[57] ABSTRACT

A one-time use camera, including: mechanical members for photographing; a front cover member; a rear cover member, light-tightly joined with the front cover member, for covering the mechanical members; and a rear grip protrusion, accommodated to the rear cover member, for providing an user-holding portion of the one-time use camera.

6 Claims, 6 Drawing Sheets

ONE-TIME USE CAMERA

BACKGROUND OF THE INVENTION

The present invention relates to a one-time use camera into which a roll of film has previously been loaded, and more specifically, to a one-time use camera having a finger-rest to more securely hold the camera.

There has been a recent tendency in which size of the one-time use cameras is reduced in consideration of portability. In conjunction with this size reduction, there is the increased possibility of the photographic lens being inadvertently covered by the operator's fingers, since the length of the camera to hold the one-time use camera is reduced. As a countermeasure, there is a one-time use camera in which a protrusion or a recess is provided on only a front cover of the camera body. An example of a conventional one-time use camera is shown in FIG. 5, which is a perspective view showing an appearance of a conventional one-time use camera, viewed from its rear side. The appearance of the one-time use camera 10 is structured of a front cover 30 and a mated rear cover 40, and further, a paper material of 5-planes. In the front part, a grip protrusion or recess, not shown in the drawing, is provided on the front cover 30. Further, a photographic lens and a view-finder window portion, not shown in the drawing, are also provided there. A shutter button 67 is provided on the upper surface of the one-time use camera. The rear of the one-time use camera is structured of a flat surface rear cover. Further, a film winding knob 50 and an eye-piece 62 for the view-finder are also provided on the rear of the unit.

However, in conventional one-time use cameras, the position for the thumb is not determined by a grip-protrusion or recess on the front cover, and is unstable, which is a problem.

SUMMARY OF THE INVENTION

The present invention is attained in view of the above problem, and an object of the present invention is to provide a one-time use camera, in which a grip is stable, and which is easily held and prevents fingers from inadvertently covering the photographic lens during photography.

The above object is attained by the following means. That is, in a one-time use camera, in which a film has been previously loaded, and mechanical members for photographing are light-tightly covered by at least a rear cover, the present invention is attained by a one-time use camera characterized in that at least a finger-rest grip protrusion is provided on the rear cover.

DETAILED DESCRIPTION OF THE PREFERRED EMBODIMENT

EXAMPLE 1

Figure 1:
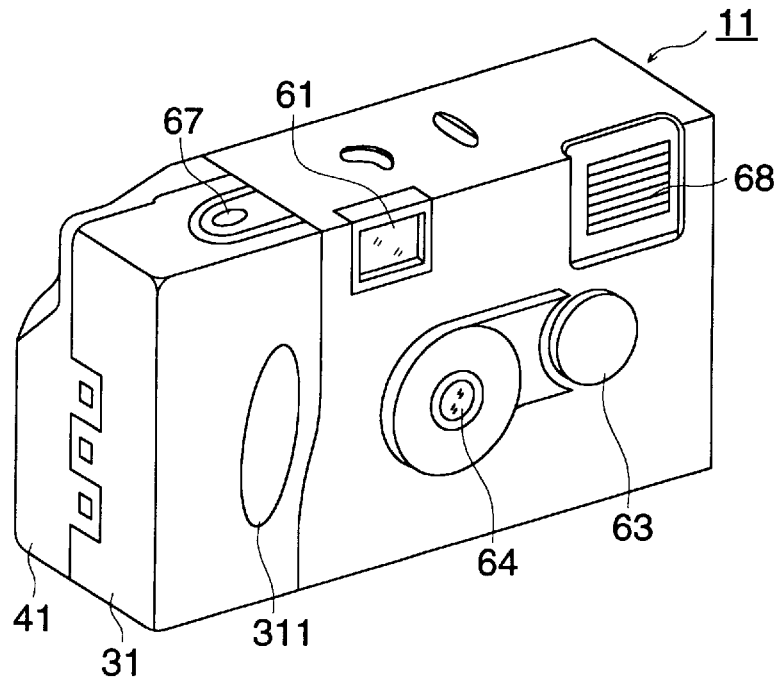
FIGS. 1(A) and 1(B) are perspective views showing appearances of a one-time use camera of the present invention
Figure 1:
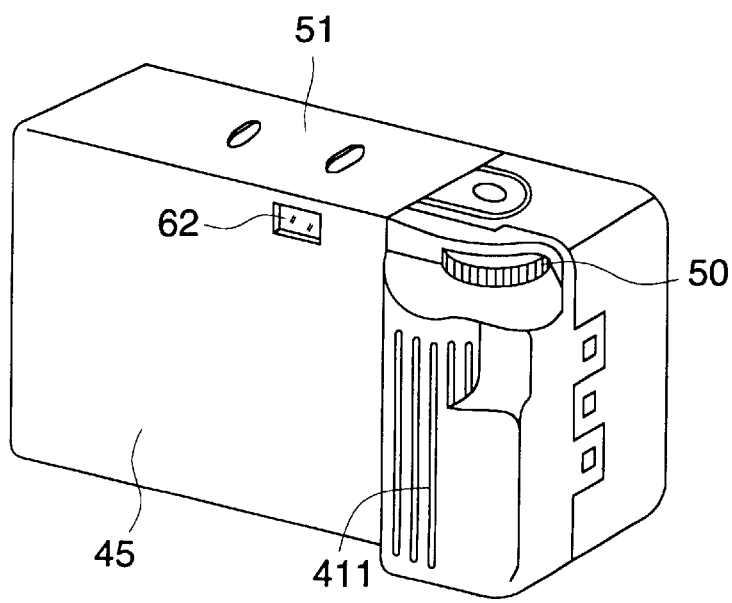

Referring to the drawings, a one-time use camera of an example of the present invention will be described below. FIG. 1 is a perspective view showing an appearance of the one-time use camera of the present invention, while FIG. 2 is a view showing a structure of a main portion of a one-time use camera of the present invention.

In FIG. 1, FIG. 1(A) is a perspective view of an appearance of the front of a one-time use camera, and FIG. 1(B) is a perspective view of an appearance of the rear of the one-time use camera. A one-time use camera is a lens shutter type camera in which a strobe unit is accommodated. A finger-recess 311 is provided on the front of the one-time use camera, a photographic lens 64 is almost centered on the front of the unit, and a view-finder window portion 61 is located slightly to the left above the photographic lens 64. Further, a strobe light emitting portion 68 and a strobe switch 63 are respectively provided on the front. A shutter button 67, which releases the shutter, is provided on the upper surface of the one-time use camera. A grip protrusion 411 which is a convex portion raised from the rear surface 45, is provided on the rear of the one-time use camera, and the operator's thumb can be easily positioned mainly in the vicinity of the border between the rear surface portion 45 and the grip protrusion 411, which serves as a thumb-rest. Several convex and concave vertical grooves are provided on the grip protrusion 411 so that the thumb is securely supported and simultaneously prevented from slipping. A film winding knob 50 and an eye piece 62 for the view-finder are respectively provided on the rear of the one-time use camera.

Figure 2:
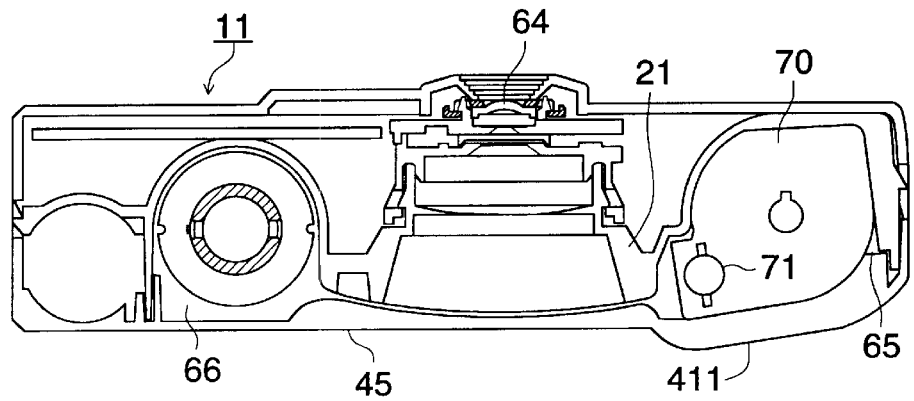
FIGS. 2(A) through 2(C) are views showing a structure of a main portion of a one-time use camera of the present invention.
Figure 2:
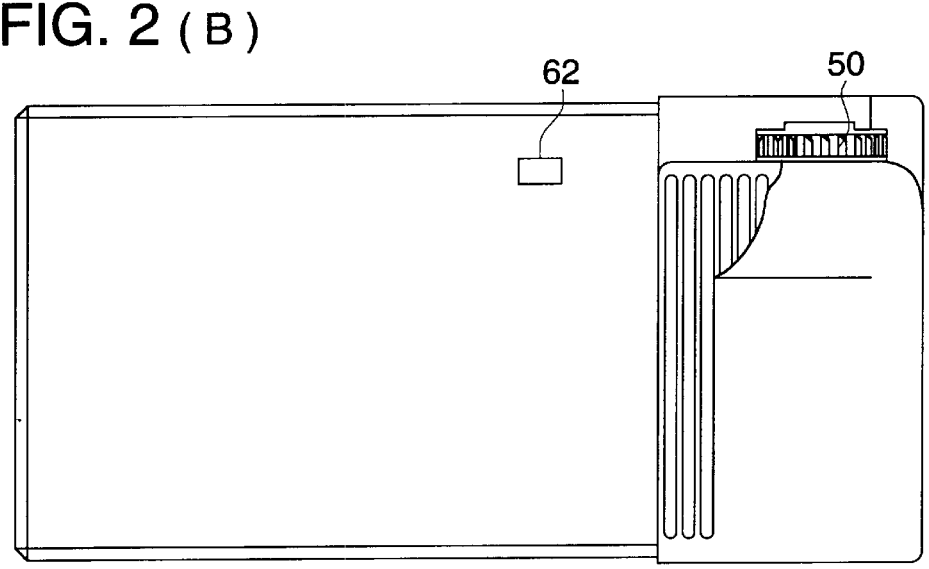
Figure 2:
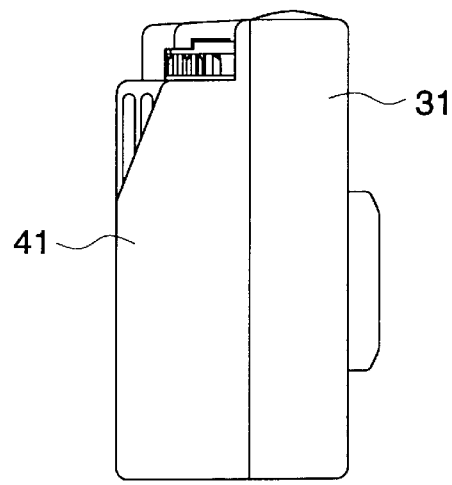

In FIG. 2, FIG. 2(A) is a sectional view which is through the optical axis of a photographic lens 64, and is in the longitudinal direction of the one-time use camera. FIG. 2(B) is a rear view of the one-time use camera, and FIG. 2(C) is a side view of the one-time use camera. In FIG. 2, the one-time use camera 11 is structured mainly of a front cover 31 and a mated rear cover 41 on the front and the rear of a camera main body 22. Further, the camera main body is covered by a cover member 51 at the five surfaces of the camera main body 22 which is an unified body of the front cover 31 and the rear cover 41. The cover member 51 is made of, for example, a paper. The grip protrusion 411 is further protruded from the rear surface portion 45 of the one-time use camera toward the rear direction of the one-time use camera to specifically serve as a secure thumb-rest. Since the grip protrusion 411 is formed dynamically so as to provide a better holding condition of the camera, it is difficult to cover the camera main body 22 with the aforementioned cover member 51. Therefore, it is desirable that the grip protrusion is provided at the portion of the rear cover 41 where it is not covered with the cover member 51. Further, cartridge 70 is a type of cartridge which has an opening/closing light-shielding cover 71 at the film entrance, and which is used while the light-shielding cover is opened after the film has been loaded into the camera. The cartridge 70 is loaded into a cartridge chamber 65 of the camera main body 21. The dimension of the cartridge chamber 65 is slightly larger at the film feeding position in the direction of the rear of the one-time use camera to accommodate the light shielding cover 71. When this portion is also used as the grip protrusion 411, the overall size of the one-time use camera can be reduced. Incidentally, the film is wound up into a scroll chamber 66.

Figure 6:
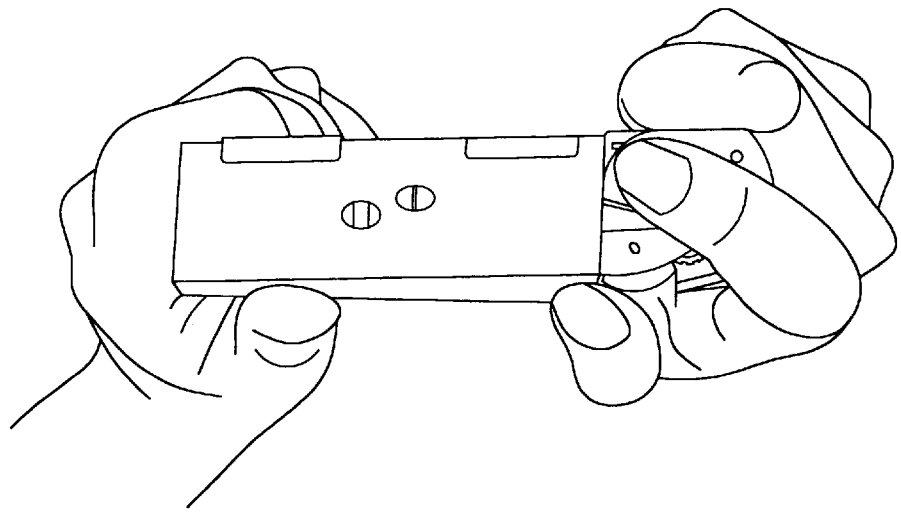
FIGS. 6(A) and 6(B) are perspective views showing appearances of a one-time use camera of the present invention when a user holds the one-time use camera.
Figure 6:
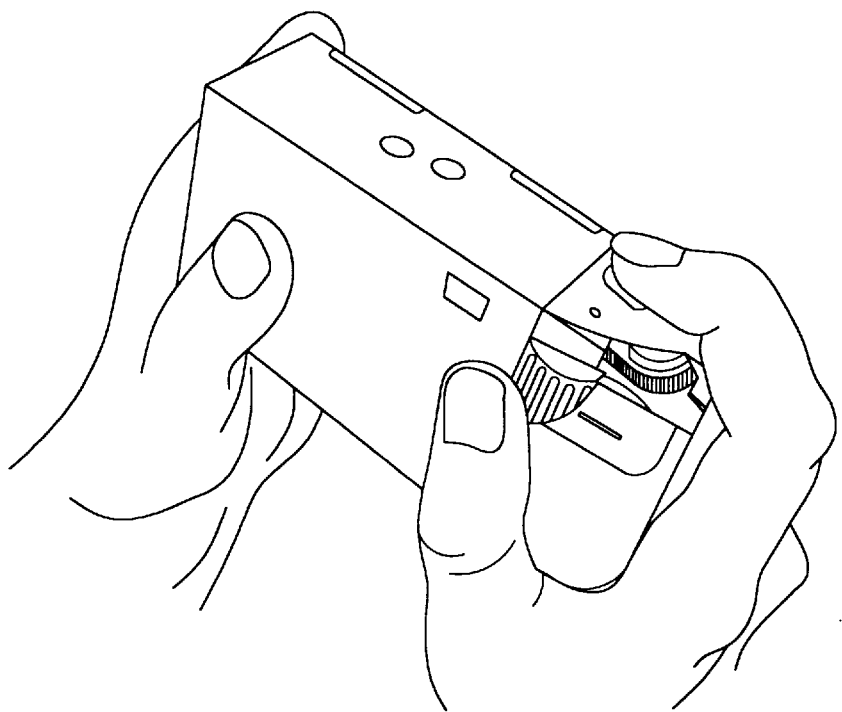

As described above, because the thumb is securely positioned during photography, the one-time use camera is more easily held as shown in FIGS. 6(A) and 6(B), and portability of the one-time use camera is enhanced. In this connection, the recess 311 in the example may not be provided.

EXAMPLE 2

Figure 3:
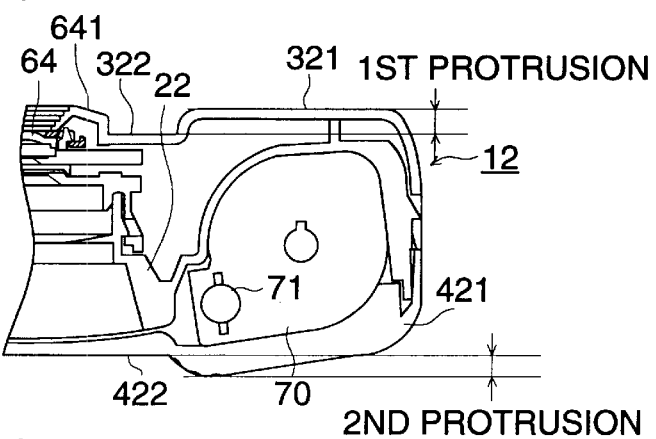
FIGS. 3(A) through 3(C) are views showing a structure of a main portion of another type of one-time use camera of the present invention.
Figure 3:
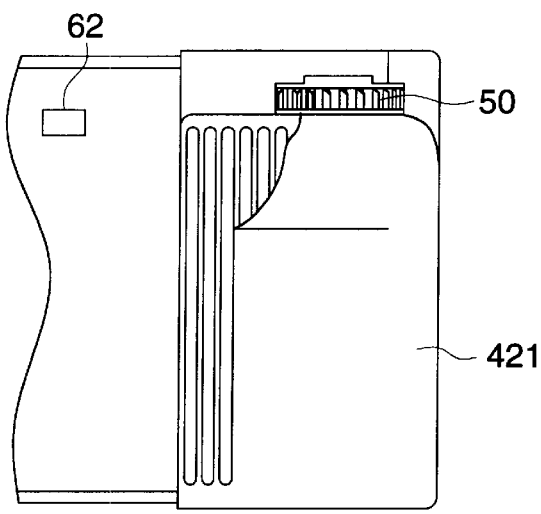
Figure 3:
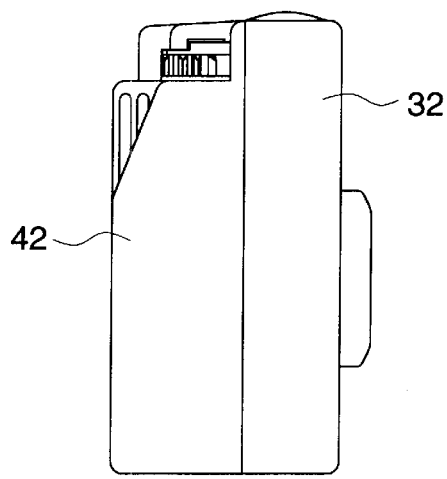

Referring to the drawings, another type of one-time use camera of the example will be described below. FIG. 3 is a structural view of a main portion of another one-time use camera of the present invention. More specifically, FIG. 3(A) is a sectional view of a main portion in the longitudinal direction through the optical axis of the photographic lens, FIG. 3(B) is a rear view of a main portion of the one-time use camera, and further, FIG. 3(C) is a side view of the one-time use camera. The same members as in Example 1 are denoted by the same numerals, and explanations are omitted for the same structural and mechanical members. The one-time use camera 12 is structured mainly of a front cover 32 and a rear cover 42, which are mated with each other, so as to enclose the camera main body 22. A grip protrusion 321 is provided on the front of the one-time use camera. Further, a photographic lens 64 and a view-finder window portion, not shown in the drawing, are also provided there. The view-finder window portion is provided between the photographic lens 64 and the grip protrusion 321, so that, even if a finger is shifted near the photographic lens side during photography, the finger is prevented from carelessly covering the photographic lens because the finger can be easily seen in the field of view of the view-finder when looking through the eye piece 62 of the view-finder. A shutter button, not shown in the drawing, is provided on the upper surface of the one-time use camera, and the shutter button is easily pressed because the one-time use camera can be stably held by the grip protrusion 321. Further, a finger-rest grip protrusion 421 having grooves is provided on the rear surface of the one-time use camera. Mainly, the holding stability of the thumb is enhanced by this grip protrusion 421. Further, because the thumb is positioned at a predetermined position, it is not positioned near the eye-piece 62 of the view-finder, enabling the operator to easily look into the view-finder.

Further, as shown in FIG. 3(A), the second protrusion, that the grip protrusion 421 is protruded from the rear reference surface, is configured greater than the first protrusion, that the grip protrusion 321 is protruded from the front reference surface. Here, "the front reference surface" is the base portion 322 of the front cover 32 and "the rear reference surface" is the base portion 422 of the rear cover 42. Further, "the first protrusion" is the distance value between the front reference surface 322 and the largest protruded portion of the grip protrusion 321 and "the second protrusion" is the distance value between the rear reference surface 422 and the largest protruded portion of the grip protrusion 421.

The shape of the grip protrusion 421 is defined by that the second protrusion from the rear reference surface 422 is between 3 mm and 10 mm. This is because it becomes difficult to prevent a finger from slipping when the grip protrusion 421 is less than 3 mm and it becomes uncomfortable to hold the camera when the grip protrusion 421 is more than 10 mm.

Still further, in the present example, the height of grip protrusion 321 is substantially the same as that of the circumferential portion of the photographing lens of the camera. Here, "the circumferential portion of the photographing lens" is the protruded portion 641 which is provided at the circumference of the photographing lens 64. When the circumferential portion of the photographing lens of the camera and the grip protrusion have substantially the same height as in the configuration of the present example, a finger of a user to hold the camera can cover the photographing lens and the finger can be unintentionally in a frame of the picture. However, in the present example, there is provided a grip protrusion 421 on the rear side of the camera and the protrusion causes a user's hand to hold the camera mainly at the rear side; therefore, the user's finger is caused to be prevented from covering the photographing lens.

As described above, in the one-time use camera, the thumb is easily positioned at a predetermined position during photographing, and the one-time use camera is easily held as shown in FIGS. 6(A) and 6(B). Further, the portability of the one-time use camera is increased, and the photographic lens and the strobe light emitting window are not covered by the operator's fingers. Still further, in the case of winding-knob type units, the winding-knob can be smoothly operated. Yet further, when the operator looks into the view-finder and prevents the eclipse by fingers in the view-finder, the photographic lens is not covered by fingers as a result. In this connection, a finger-rest recess 311 may also be provided on the front cover as shown in FIG. 1.

EXAMPLE 3

Figure 4:
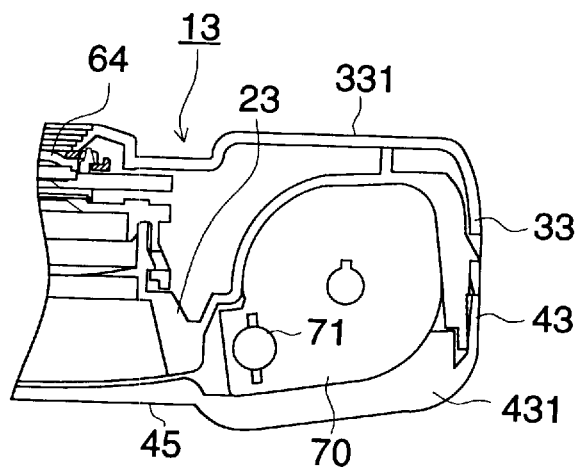
FIGS. 4(A) and 4(B) are views showing a structure of a main portion of still another one-time use camera of the present invention.
Figure 4:
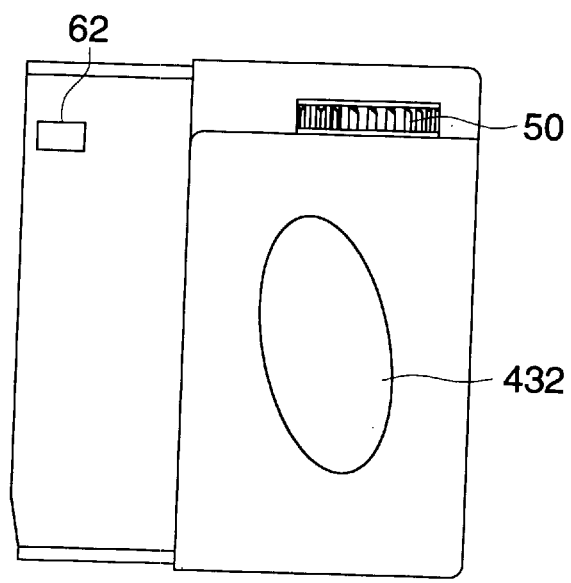
Figure 5:
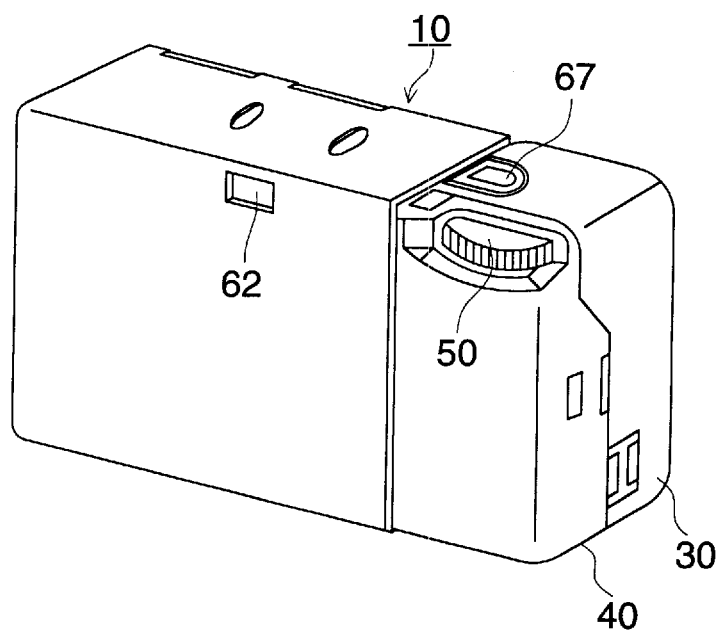
FIG. 5 is a perspective view of an appearance viewed from the rear of a conventional one-time use camera.

As an example, another one-time use camera will be described below, referring to the drawings. FIG. 4 is a structural view of a main portion of another one-time use camera. More specifically, FIG. 4(A) is a sectional view of a main portion in the longitudinal direction of the one-time use camera through the optical axis of the photographic lens, and FIG. 4(B) is a rear view of a main portion of the camera. In this connection, the same members as in Example 1 are denoted by the same numerals, and explanations are omitted for the same structural and mechanical members. The appearance of the one-time use camera 13 is mainly structured by a front cover 33 and a mated rear cover 43. The grip protrusion 331, the photographic lens 64 and the view-finder window portion, not shown in the drawings, are provided on the front of the one-time use camera. The shutter button, not shown in the drawings, is provided on the upper surface of the one-time use camera. The finger-rest grip protrusion 431, a recess 432, a winding knob 50, and the eye-piece 62 of the view-finder, are respectively provided on the rear surface of the one-time use camera.

As described above, in the one-time use camera, the thumb is easily positioned at a predetermined position during photographing, and the one-time use camera is easily held as shown in FIGS. 6(A) and 6(B). Further, the photographic lens and the strobe light emitting window are not covered by fingers. Furthermore, the portability of the one-time use camera is increased, and in the case of winding-knob type units, the winding-knob can be smoothly operated. Yet further, the operator looks into the view-finder and prevents the eclipse by fingers in the view-finder, and, as a result, the photographic lens is not likely to be covered by his fingers. In this connection, a finger-rest recess 311 may also be provided on the front cover as shown in FIG. 1, and the recess 432 on the rear surface may be omitted.

Incidentally, in the above examples, a cartridge having an opening/closing light shield cover at the film entrance has been described, but a common 35 mm film cartridge may also be used.

Since the present invention is structured as described above, it has the following effects.

In an example of the present invention, in a one-time use camera in which mechanical members for photographing are light-tightly covered at least by a rear cover, at least one finger-rest grip protrusion is provided on the rear cover, and thereby, the one-time use camera can be easily carried, the operator's thumb is easily positioned at a predetermined position during photographing, and the camera is easily held.

In the first example of the present invention, in the one-time use camera described above, the grip protrusion is formed into the convex-shape with respect to the flat rear surface portion, except the grip protrusion on the opposite side of a photographic lens of the one-time use camera, and thereby, the one-time use camera is easily carried, the operator's thumb is easily positioned at a predetermined position during photographing, and the one-time use camera is easily held.

In the second and the third examples of the present invention, in any of the one-time use cameras described above, at least one finger-rest grip protrusion is provided on the front cover of the one-time use camera, and thereby, the photographic lens and the strobe light emitting window are less likely to be inadvertently covered by fingers. Further, in the case of winding knob types, the knob winding-up operation is more smoothly carried out.

In the second and the third examples of the present example, in any of the one-time use cameras described above, a view-finder window portion is arranged between the photographic lens and the grip protrusion, viewed horizontally from the front of the one-time use camera, and thereby, when the operator looks into the view-finder and prevents the eclipse by fingers in the view-finder, the photographic lens is less likely to be inadvertently covered by fingers as the result.

In the present invention, further, a cartridge having an opening/closing light shielding cover is arranged at the film entrance inside the grip protrusion, and thereby, in the one-time use camera using a cartridge, in which the film is accommodated, and which has the opening/closing light shielding cover at the film entrance, the one-time use camera is easily carried, the operator's thumb is easily positioned at a predetermined position during photographing, and further, the one-time use camera is easily held.

What is claimed is:

1. A one-time use camera, comprising:

mechanical members for photographing;

a front cover member;

a front grip portion, accommodated to said front cover member, for providing an user-holding portion of said one-time use camera;

a rear cover member, light-tightly joined with said front cover member, for covering said mechanical members;

a rear grip protrusion, accommodated to said rear cover member, for providing an user-holding portion of said one-time use camera, said rear grip protrusion protruding a second protrusion distance away from said rear cover member; and a film winding knob for winding a photographic film by rotating said film winding knob, a part of said film winding knob being exposed to outside said rear cover member, wherein a portion of said rear grip protrusion, as said second protrusion distance, is provided on said rear cover between said film winding knob and center of said rear cover member.

2. The one-time use camera of claim 1, wherein said second protrusion distance is between 3 mm and 10 mm.

3. The one-time use camera of claim 1, further comprising;

a cover member for covering a part of said front cover member and said rear cover member;

wherein said front cover member is not covered with said cover member and said rear grip protrusion is accommodated to said rear cover member where said rear cover member is not covered with said cover member.

4. The one-time use camera of claim 1, further comprising;

a photographing lens; and a circumferential portion of said photographing lens, said circumferential portion protruding a distance away from said front cover member which is substantially equal to said first protrusion distance.

5. The one-time use camera of claim 1, wherein said front grip portion is a front grip protrusion and said front grip protrusion protruding a first protrusion distance away from said front cover member.

6. The one-time use camera of claim 5, wherein said first protrusion distance is smaller than said second protrusion distance.

* * * * *